United States Patent [19]

Jourdain et al.

[11] Patent Number: 4,716,640
[45] Date of Patent: Jan. 5, 1988

[54] METHOD FOR MANUFACTURING A BURNER RING FOR A TURBOJET ENGINE

[75] Inventors: Gerard E. A. Jourdain, Saintry sur Seine; François, M. B. Marlin, Melun, both of France

[73] Assignee: Societe Nationale d'Etude et de Construction de Moteurs d'Aviation-S.N.E.C.M.A., Paris, France

[21] Appl. No.: 907,098

[22] Filed: Sep. 15, 1986

[30] Foreign Application Priority Data

Sep. 18, 1985 [FR] France ................ 85 13794

[51] Int. Cl.$^4$ .......................................... B21D 53/00
[52] U.S. Cl. .................. 29/157 C; 29/419 R; 29/DIG. 25; 156/89; 156/172; 156/187
[58] Field of Search ........ 29/157 C, 419 R, DIG. 25; 156/89, 172, 187; 60/722, 723, 39.822, 39.826

[56] References Cited

U.S. PATENT DOCUMENTS

| | | | |
|---|---|---|---|
| 2,780,916 | 2/1957 | Collins | 60/39.826 X |
| 2,964,907 | 12/1960 | Toone | 60/723 |
| 4,148,121 | 4/1979 | Butter et al. | 29/157 C |
| 4,278,485 | 7/1981 | Hamm et al. | 156/173 |
| 4,359,190 | 11/1982 | Pagano | 29/157 C X |
| 4,440,587 | 4/1984 | Thompson et al. | 29/157 C X |
| 4,531,271 | 7/1985 | Lechner et al. | 29/157 C |

FOREIGN PATENT DOCUMENTS 2024403 1/1980 United Kingdom .
2107630 5/1983 United Kingdom .

Primary Examiner—P. W. Echols
Assistant Examiner—Ronald S. Wallace
Attorney, Agent, or Firm—Bacon & Thomas

[57] ABSTRACT

Disclosed is a method of manufacturing a composite material burner ring made wholly of a composite material. The burner ring is manufactured by winding a carbon or ceramic type refractory material about a toroidal form until a specific material thickness is obtained. The burner ring elements, such as radial arms, fastening clips or fuel feed tubes are then fastened onto the winding. Each of the elements may be formed in mirror-image halves and may be assembled onto the burner ring body in adjacent pairs, each one of the pairs facing in an opposite direction. The winding of the composite material is continued until a final thickness is obtained, thereby integrally attaching the burner ring elements to the burner ring body. The assembly is then subjected to a carbonization or ceramization head treating process. After this process, the burner ring body is cut along a plane extending generally perpendicular to the longitudinal axis of the toroidal form such that two burner ring assemblies having gutter-shaped cross-sections are formed when removed from the toroidal form.

15 Claims, 24 Drawing Figures

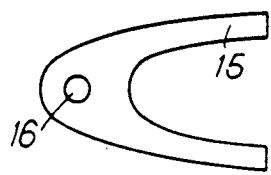
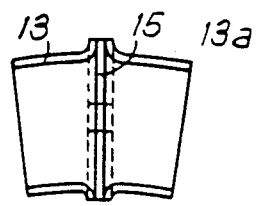
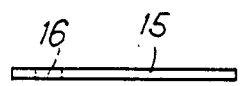
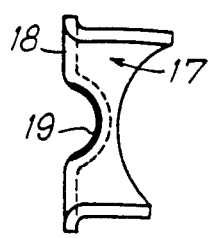
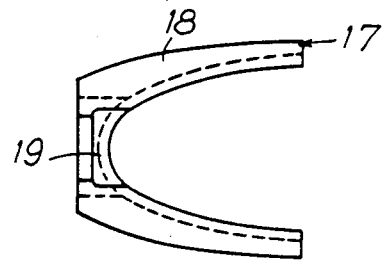
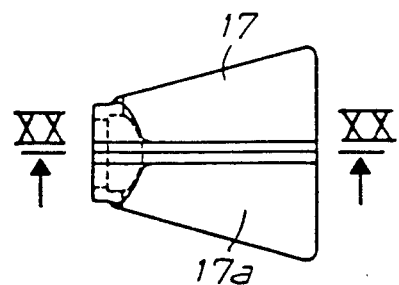

METHOD FOR MANUFACTURING A BURNER RING FOR A TURBOJET ENGINE

BACKGROUND OF THE INVENTION

It is well known to use articles formed of composite materials in structures which are not subjected to extremely high temperatures. Such temperatures degrade the mechanical properties of the resin in the composite materials.

The deficiencies of these composite materials have been somewhat overcome by the introduction of ceramic type composite materials. These ceramic composites make it possible to fabricate parts of engines, such as turbojet engines, which are subjected to extremely high operating temperatures. This material has been utilized to fabricate turbojet engine nozzle flaps, thrust reversers and exhaust nozzles for rocket motors. Typically, these elements are fabricated from "carbon-carbon" fabric material.

Burner rings for turbojet engines have been experimentally manufactured utilizing composite material in combination with metallic fasteners to attach the burner ring structure to the surrounding jet engine structure. The metallic fasteners have been cemented or riveted to the composite material. However, due to the great variance in the coefficients of thermal expansion between the ceramic and metallic elements, detachment of these elements usually occurs in the middle of the composite fiber layers. Thus, the operating parameters to which these assemblies may be subjected are extremely limited.

SUMMARY OF THE INVENTION

The object of the invention is to provide a method manufacturing a composite material burner ring made wholly of a composite material. The burner ring is manufactured by winding a carbon or ceramic type refractory material about a toroidal form until a specific material thickness is obtained. A plurality of burner ring elements, such as radial arms, fastening clips or fuel feed tubes are then fastened onto the winding. Each of the elements may be formed in mirror-image halves and may be assembled onto the burner ring body in adjacent pairs, each one of the pairs facing in an opposite direction. The winding of the composite material is continued until a final thickness is obtained, thereby intgrally attaching the burner ring elements to the burner ring body. The assembly is then subjected to a carbonization or ceramization heat treating process. After this process, the burner ring body is cut along a plane extending generally perpendicular to the longitudinal axis of the toroidal form such that two burner ring assemblies having gutter-shaped cross-sections are formed when removed from the toroidal form.

The burner ring formed by this method avoids the drawbacks the prior art hybrid structures, since no metallic fasteners or other elements are utilized. Furthermore, integrally forming the burner ring elements with the burner ring body improves the mechanical strength of the resultant structure.

BRIEF DESCRIPTION OF THE DRAWINGS

FIG. 15 is a side view of a spacer member which may be utilized with the fastening clip shown in FIG. 12.

FIG. 16 is a rear view of the fastening clip incorporating the spacer member between the mirror-image halves.

FIG. 17 is a top view of the spacer member shown in FIG. 15.

FIG. 18 is a side, elevational view of a fuel feed tube element which may be attached to the burner ring body according to the invention.

FIG. 19 is a front view of one of the mirror-image elements utilized to form the fuel feed tube shown in FIG. 18.

FIG. 20 is a sectional view taken along line XX—XX in FIG. 18.

DETAILED DESCRIPTION OF THE PREFERRED EMBODIMENTS

Figure 1:
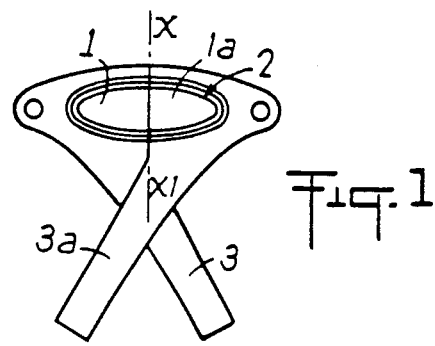
FIG. 1 is a partial, cross-sectional view of the burner ring body, the toroidal form and the burner ring elements during use of the process according to this invention.
Figure 2:
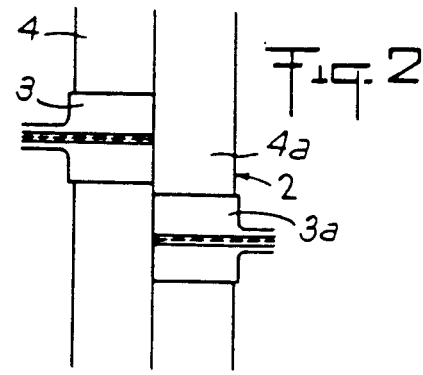
FIG. 2 is a partial top view of the burner ring as shown in FIG. 1.
Figure 21:
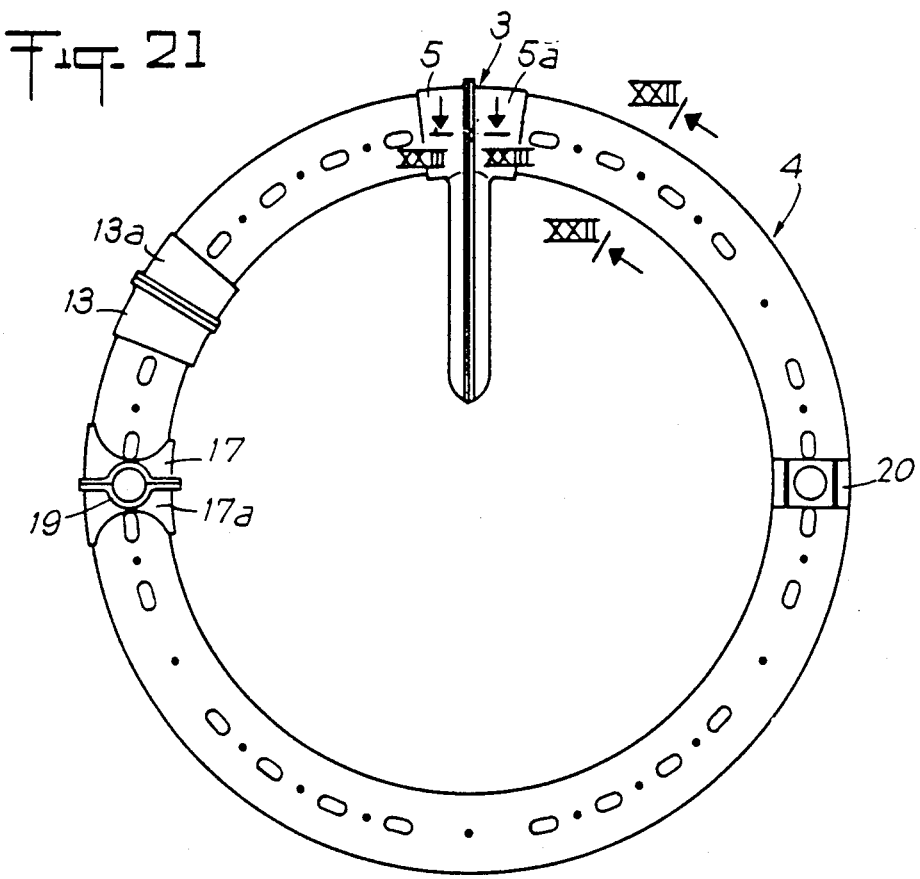
FIG. 21 is a front, elevational view of a burner ring formed according to the invention.
Figure 22:
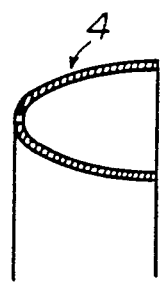
FIG. 22 is a partial, sectional view taken along line XXII—XXII in FIG. 21.

A burner ring structure formed according to this invention is shown in FIG. 21 and may comprise a burner ring body for having a plurality of burner ring elements attached thereto, such as radially inwardly extending arm structure 3, a fastening clip 13, and a fuel feed tube 19. The burner ring structure is manufactured by helically winding a refractory ceramic or carbon composite material 2 about the exposed outer surface of a toroidal spindle as shown in FIGS. 1 and 2. The toroidal spindle may comprise two separable elements 1 and 1a which are separable along a plane $XX_1$ which extends substantially perpendicular to the central axis of the toroidal form. The toroidal form may have a substantially elliptical cross-section as shown in FIG. 1.

Figure 3:
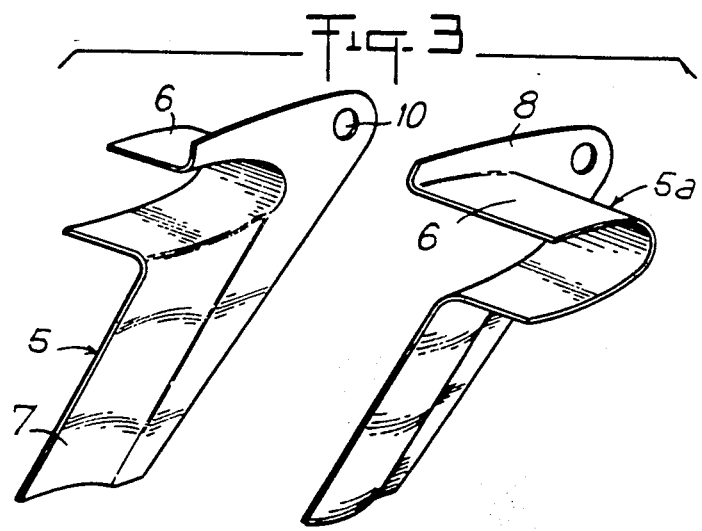
FIG. 3 is an exploded, perspective view of a radial arm burner ring element formed in mirror-image halves.
Figures 4, 5, 6, 7:
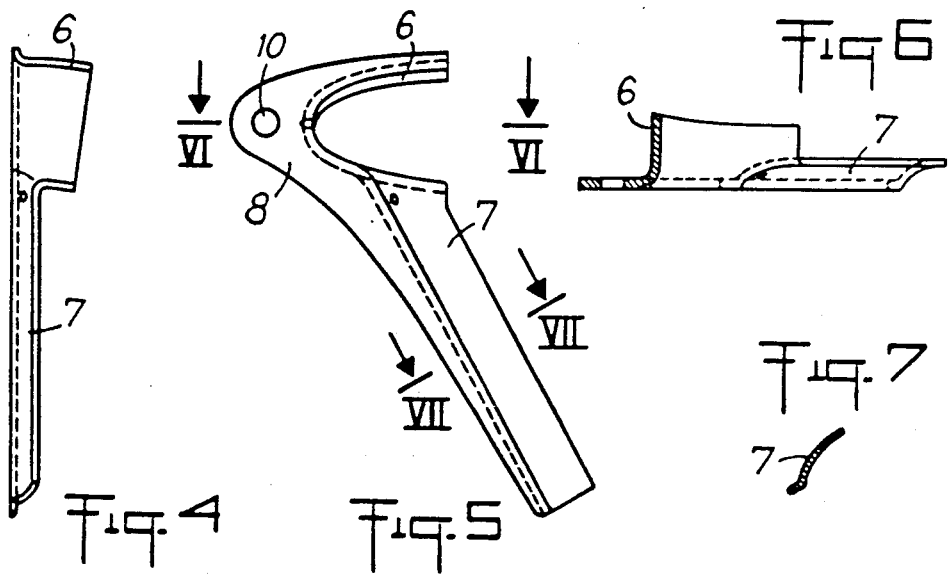
FIG. 4 is a rear, elevational view of one of the mirror-image halves shown in FIG. 3.
FIG. 5 is a side view of the radial arm shown in FIG. 4.
FIG. 6 is a sectional view taken along line VI—VI in FIG. 5.
FIG. 7 is a sectional view taken along line VII—VII in FIG. 5.

Once the winding has attained a specific, predetermined thickness, which may be approximately one-half the desired thickness of the burner ring body 4, the winding is stopped and the burner ring elements are attached to the burner ring body. Each of the burner ring elements, such as radial arms 3 and 3a are formed of mirror-image halves, as shown in FIG. 3. They are attached to the burner ring body in adjacent pairs, with each one of a pair facing in an opposite direction as shown in FIG. 2. Thus, the radial arm 3 is attached to one side of the toroidal structure, while radial arm 3a is attached to the opposite side so as to face in an opposite direction.

After attaching the desired number of burner ring elements to the burner ring body, the winding of the refractory material is continued until the final thickness of the burner ring body is achieved. The entire assembly is then subjected to a carbonization or ceramization heat-treating process until it is fully carbonized or ceramized.

At this point, the burner ring body is cut along the plane X-X₁ extending generally perpendicular to a central axis of the toroid form. After the two elements 1 and 1a of the toroidal form are removed, a pair of burner rings, each having a gutter-shaped, semi-elliptical cross-section are formed.

The radial arms 3 and 3a attached to burner ring bodies 4 and 4a respectively, each may comprise two mirror-image half shells 5 and 5a as shown in FIGS. 3-7. Each of the half shells has a half collar 6, a radially extending wall 7 and a flange 8. Flange 8 defines an opening 10 to facilitate attachment of the burner ring to the surrounding turbojet engine structure. The mirror-image halves 5 and 5a are bonded to each other and to the burner ring body 4 during the previously described winding procedure.

Figure 8:
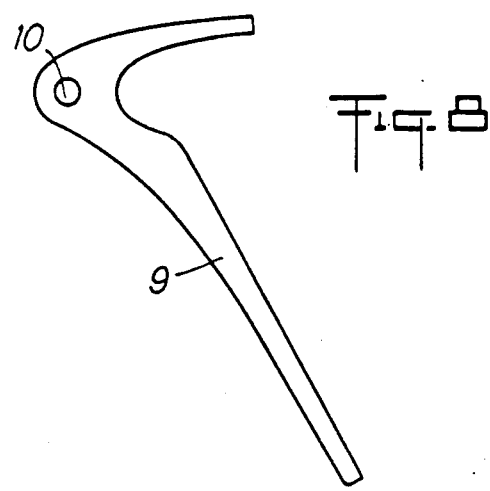
FIG. 8 is a side view of a spacer member which may be interposed between the mirror image halves of the radial arm shown in FIG. 3.
Figure 9:
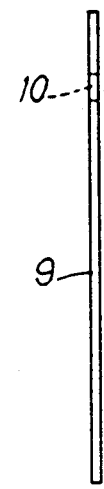
FIG. 9 is a rear view of the spacer member shown in FIG. 8.
Figure 10:
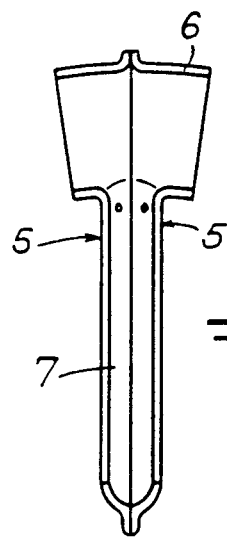
FIG. 10 is a rear view of the radial arm in FIG. 3 showing the mirror image halves assembled together.
Figure 11:
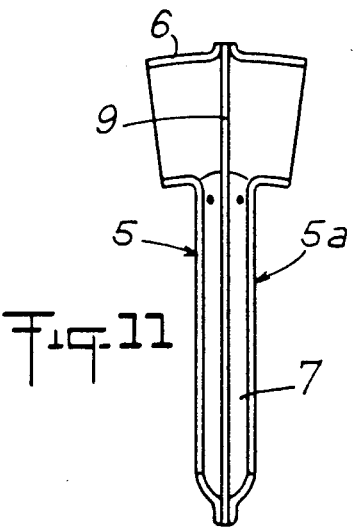
FIG. 11 is a rear view of the mirror-image halves shown in FIG. 3 incorporating the spacer member of FIG. 8 therein.

In an alternative embodiment, a spacer 9 (shown in FIGS. 8 and 9) may be interposed between the mirror-image halves 5 and 5a, as shown in FIG. 11. In this embodiment, the spacer defines an opening 10 to facilitate attachment of the burner ring to the surrounding structure.

Figure 23:
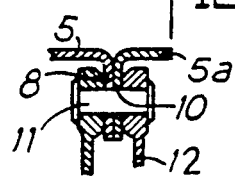
FIG. 23 is a partial, cross-sectional view of a first embodiment of an attaching device taken along line XXIII—XXIII in FIG. 21.
Figure 24:
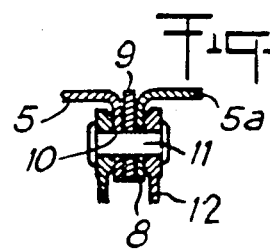
FIG. 24 is a partial, cross-sectional view of an alternative embodiment of the fastening device taken along line XXIII—XXIII in FIG. 21.

Opening 10, as shown in the two embodiments, may accommodate pivot pin 11 (see FIGS. 23 and 24) which, in turn, is attached to fastening links 12. The opposite end of the links 12 (not shown) are attached to the turbojet engine structure by known means.

Figure 12:
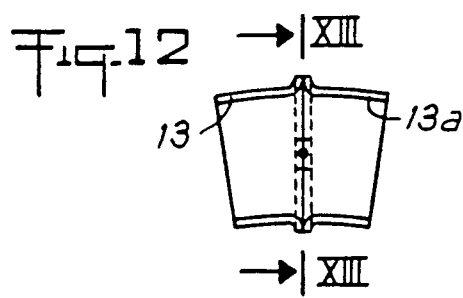
FIG. 12 is a rear, elevational view of a fastener clip which may be attached to the burner ring body according to the invention.
Figure 13:
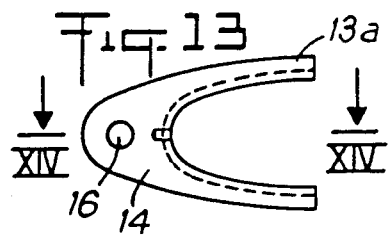
FIG. 13 is a sectional view taken along line XIII—XIII in FIG. 12.
Figure 14:
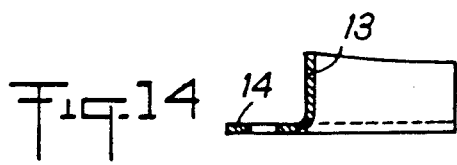
FIG. 14 is a cross-sectional view taken along line XIV—XIV in FIG. 13.

The burner ring elements may also include fastening clips, formed also of image halves 13 and 13a as shown in FIGS. 12–14. Each of the mirror-image halves may be formed with flange 14 which defines opening 16. Opening 16 performs the same function as opening 10, previously discussed, in attaching the burner ring to a surrounding structure.

In an alternative embodiment, a spacer 15 may be interposed between the mirror-image halves of the fastening clip as shown in FIGS. 15–17. In this embodiment, spacer 15 defines the attachment opening 16.

The flanges 14 of the fastening clips are bonded to each other, or to the spacer prior to attaching the assembly to the burner ring during the previously described winding process.

Another burner ring element may be a fuel feed tube, as shown in FIGS. 18–20, though which pass the feed tubes for a fuel manifold. The fuel feed tubes are formed of mirror-image halves 17 and 17a by bonding together mating flanges 18. Each of the halves define a semi-cylindrical cavity 19 to accommodate fuel manifold feed tubes not shown. Once the halves are bonded together, the assembly is attached to the burner ring body 4 by the winding process previously described. The fuel feed tube may be formed as element 20, shown in FIG. 21.

The foregoing description is provided for illustrative purposes only and should not be construed as in any way limiting this invention, the scope of which is defined solely by the appended claims.

What is claimed is:

1. A method of manufacturing an annular burner ring for a turbojet engine, the burner ring having a gutter-shaped cross-section, comprising the steps of:
   (a) forming a burner ring body by winding a refractory material about the exposed surface of a toroidal form;
   (b) stopping the winding when a predetermined thickness of refractory material has been reached;
   (c) attaching at least one burner ring element to the refractory material of the burner ring body wound on the toroidal form;
   (d) winding additional refractory material about the toroidal form until final thickness of the burner ring body is reached;
   (e) subjecting the refractory material to a heat treating process;
   (f) cutting the refractory material in half along a plane extending generally perpendicular to a central axis of the toroidal form; and,
   (g) separating the toroidal form from the refractory material so as to form the burner ring body in an annular shape having a gutter-shaped cross section.

2. The method according to claim 1 wherein the refractory material is a ceramic.

3. The method according to claim 1 wherein the refractory material is carbon.

4. The method according to claim 1 wherein a plurality of burner ring elements are attached to the refractory material of the burner ring body.

5. The method according to claim 4 further comprising the additional step of attaching pairs of burner ring elements to the refractory material of the burner ring body such that alternate, adjacent pairs of burner ring elements are attached to opposite halves of the refractory material.

6. The method according to claim 5 wherein the toroidal form has a substantially elliptical cross-section.

7. The method according to claim 6 comprising the additional step of separating the toroidal form along a plane extending substantially perpendicular to a central axis of the form.

8. The method according to claim 7 comprising the additional step of forming each of the burner ring elements in mirror-image halves prior to attaching them to the refractory material.

9. The method according to claim 8 comprising the step of forming the ring element halves of a refractory material.

10. The method according to claim 9 comprising the additional step of forming the burner ring element halves from a ceramic refractory material.

11. The method according to claim 9 comprising the additional step of forming the burner ring element halves from a carbon refractory material.

12. The method according to claim 9 comprising the step of forming a burner ring element as a radially inwardly extending arm.

13. The method according to claim 9 comprising the step of forming a burner ring element as a fastening clip.

14. The method according to claim 9 comprising the step of forming a burner ring element as a fuel feed tube defining an opening extending substantially perpendicular to the plane of the burner ring.

15. The method according to claim 9 comprising the additional steps of: forming a spacer; and, attaching the spacer to the burner ring elements between the mirror-image halves.

* * * * *

UNITED STATES PATENT AND TRADEMARK OFFICE
CERTIFICATE OF CORRECTION

PATENT NO. : 4,716,640

DATED : Jan. 5, 1988

INVENTOR(S) : JOURDAIN et al

It is certified that error appears in the above—identified patent and that said Letters Patent is hereby corrected as shown below:

Col. 1, line 36 , after "method" insert --of--.

Col. 1, line 48, "intgrally" should be --integrally--.

Col. 1, line 58, insert --of-- before "the prior".

Col. 3, line 67 "though" should be "through".

In the ABSTRACT, 6 lines from bottom, "head treating" should be --heat treating--.

Signed and Sealed this

Seventeenth Day of May, 1988

Attest:

DONALD J. QUIGG

Attesting Officer

Commissioner of Patents and Trademarks